United States Patent [19]
Hutchison

[11] 3,789,094
[45] Jan. 29, 1974

[54] METHOD OF PRODUCING A MOLDED FOAMED STRUCTURAL MEMBER HAVING A HONEYCOMB CORE ADAPTED FOR VENTING

[75] Inventor: David John Hutchison, Toronto, Ontario, Canada

[73] Assignee: Monostruct Corporation, Limited, Toronto, Ontario, Canada

[22] Filed: May 6, 1971

[21] Appl. No.: 140,748

[52] U.S. Cl............. 264/45, 52/309, 52/618, 161/68, 161/69, 161/161, 264/273, 264/275, 264/277, 425/812
[51] Int. Cl.................................. B29d 27/04
[58] Field of Search....... 264/45, 271, 273, 275, 45, 264/277; 161/68, 161, 69; 52/576, 577, 309, 618; 425/812

[56] References Cited
UNITED STATES PATENTS

| | | | |
|---|---|---|---|
| 2,525,880 | 10/1950 | Feldman | 264/55 |
| 2,828,235 | 3/1958 | Holland | 52/618 X |
| 3,150,793 | 9/1964 | Messer | 264/45 X |
| 2,744,042 | 5/1956 | Pace | 264/45 |
| 3,229,437 | 1/1966 | Adie | 161/68 X |
| 3,543,315 | 12/1970 | Hoffman | 161/68 X |

FOREIGN PATENTS OR APPLICATIONS

| | | | |
|---|---|---|---|
| 240,944 | 7/1958 | Australia | 161/68 |
| 723,621 | 2/1955 | Great Britain | 264/45 |
| 810,809 | 3/1959 | Great Britain | 161/68 |

*Primary Examiner*—Philip E. Anderson
*Attorney, Agent, or Firm*—Douglas S. Johnson

[57] ABSTRACT

A cored, molded structural member comprises a core having a plurality of cells between major faces - a honeycomb core - and having a substantially seamless covering of moldable plastic material which expands while it sets and which, when set, is substantially rigid. Foamable polyurethane is particularly contemplated. At least some of the cells of the core are adapted to have gas communication with other, adjacent cells when the pressure of the gas and/or air within the cell rises. The molded structural member is formed in a mold which is entirely closed and gas tight so as to preclude flow of gas or air outwardly from the mold cavity during the molding operation. Spacers may be used to space the core away from the faces of the mold cavity, and to keep the core from shifting within the mold cavity as the plastic material expands and sets. Pressure relief of the pressurized mold is usually provided before the mold is opened, by making one or more channels through the plastic covering in the core.

7 Claims, 9 Drawing Figures

PATENTED JAN 29 1974

INVENTOR.
DAVID J. HUTCHISON.

BY

INVENTOR.
DAVID J. HUTCHISON.

und 3,789,094

METHOD OF PRODUCING A MOLDED FOAMED STRUCTURAL MEMBER HAVING A HONEYCOMB CORE ADAPTED FOR VENTING

BACKGROUND OF THE INVENTION:

This invention relates to a method of producing a molded structural member having a core. The invention relates particularly to the production of a cored, molded structural member having a substantially seamless covering of moldable plastic material over a multicellular core. The moldable plastic material is one which expands while it is setting and which, when set, is substantially rigid.

It is a feature of the present invention that the core of the molded structural member is such that gas communication between adjacent cells occurs at least when the gas pressure of gas within the cells increases by a finite amount above the ambient pressure — that is, when the core is pressurized. In a finished, molded structural member, gas communication from within the core to the ambient is usually provided. A method of producing the molded structural member of this invention is taught, which method includes a step whereby the mold cavity in which the molded structural member of this invention is formed can be made substantially gas tight so as to substantially preclude gas flow outwards from the mold cavity at least during the time that the plastic material of the covering expands and sets.

Copending application Ser. No. 50.787 filed June 29, 1970, of common inventorship and assignee with the present application, teaches a cored panel and method of producing the same. The core which is particularly contemplated for use in the cored panel is one which is known as a honeycomb core, of kraft or other heavy paper, and having substantially parallel major faces and a plurality of walls extended between them so as to form a plurality of cells. The covering over the core is substantially seamless over both major faces of the core and over at least a portion of the outer periphery of the core. It has been found that a core which is adapted to have gas communication between the cells - at least when the gas pressure of gas within the cell is such that the core is essentially pressurized — provides distinct advantages, particularly in terms of structural and dimensional stability. Also, it has been found that the method of producing cored, molded structural members according to the present invention should be such that the mold cavity can be substantially sealed to be gas tight and so as to preclude outward flow of gas therefrom during the molding process.

Another feature of the present invention is that the seamless covering over the core is a moldable plastic material of the sort which expands while it is setting and which, when set, is substantially rigid. Such materials as foamable polyurethane — particularly the self-skinning variety — and expandable polystyrene beads, are particulary useful. When such materials as foamable polyurethane are used, some gas is generated as the foam comes up, and other gas — particularly air entrapped within the mold cavity — is displaced by the foam. Also, because the foaming and setting reaction of the polyurethane is exothermic, heat generated by that reaction may tend to cause gas expansion of gas within the mold cavity. Previously, gas has been permitted to escape — or outgas — from a mold cavity by the use of gassing paper placed around the parting line of the mold, and by gas vents placed in the mold where necessary. However, the molded product usually has a mold flash in the place where it has foamed up into the gassing paper, and sometimes air or other gas becomes entrapped within the mold cavity in such a manner that the surface of the molded product is pocketed and marred. However, the provision of a core structure into which any gas or air within the mold can migrate during the molding process has resulted in better surface finish and mold configuration of the product; with a much lower reject rate and higher structural and dimensional stability than has otherwise been possible. Provisions are generally made to depressurize the core and to let the gas within it escape therefrom before the molded structural member is unmolded. Because of the pressures which may be encountered, particularly in large members such as panels in doors, containers, etc., provision is generally made to reinforce the mold at its exterior to stiffen it and thereby create reaction forces against outwardly directed forces generated by the pressure of gas and air within the core.

The present invention teaches the use of spacers, each of which has a pair of substantially coaxial legs with a radially projecting, substantially planar land between them. Ideally, the spacers are provided so that one of the legs can easily pierce one of the outer, major faces of the core. The spacers are used so that the core is precluded from dropping to touch a lower face of the mold cavity when placed in the mold, or floating up against an upper face of the mold cavity during the molding process.

It has been found that, for additional rigidity, the core can be cut along at least one of its major faces so that some of the cells of the core may be open — at least at one end — past the major face so as to permit the moldable plastic material of the covering to flow into the open cells during the molding operation. Also, a core having a heat reflective coating such as foil on one side of one of the major faces can be used in the molded structural member of this invention; and interruptions are provided in the heat reflective coating to permit gas communication to the interior of the core.

BRIEF SUMMARY OF THE INVENTION

An object of this invention is to provide a molded structural panel having comparatively low density, high strength to weight ratio, and in which the core is adapted to be pressurized at least during the production of the same.

A further object of this invention is to provide a cored, molded structural member and method of making the same using a moldable plastic material, and which can be easily and inexpensively produced.

A still further object of this invention is to provide a substantially seamless, cored, molded structural member which may have an irregular and/or curved cross-section.

BRIEF DESCRIPTION OF THE DRAWINGS:

These and other features and objects of the invention will be discussed in greater detail hereafter in association with the accompanying drawings, in which:

FIG. 2 is a cross-section of the structural member of

FIG. 1 taken in the direction of arrows 2—2 in FIG. 1;

DESCRIPTION OF THE PREFERRED EMBODIMENTS

Figure 1:
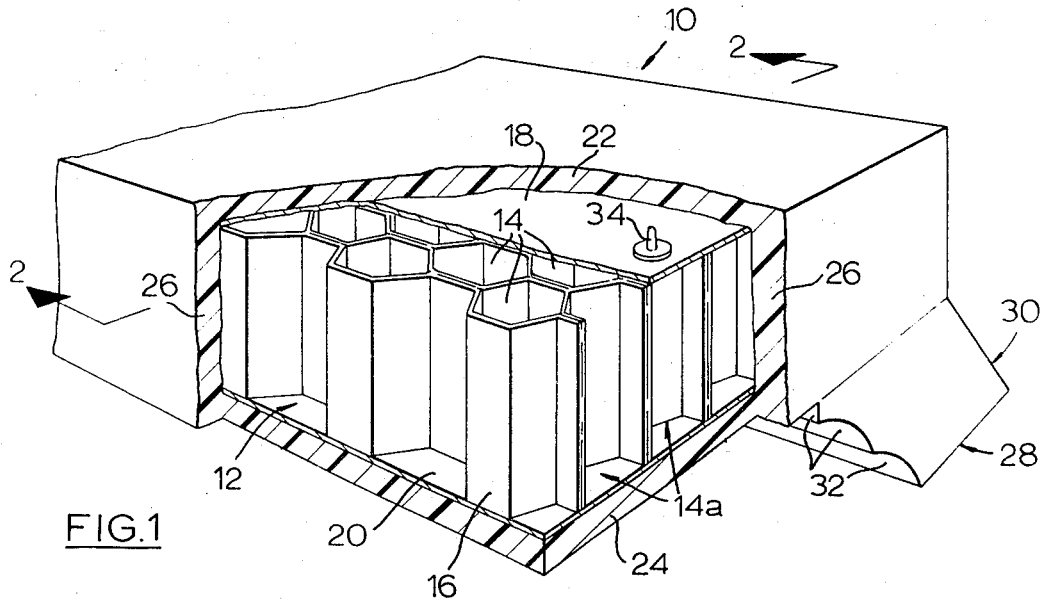
FIG. 1 is a perspective, partially cut-away view of a typical molded structural member according to this invention.

A portion of a molded sturctural member 10 is shown in FIG. 1. The purpose to which the molded structural member 10 is put, and therefore the specific dimensions and the configuration of the molded structural member 10, is essentially irrelevant to the present discussion. For example, a molded structural member in accordance with this member may be used as a wall panel in such installations as curtain walls and movable partitions; spandrels or lintels; doors; other wall panels in prefabricated structures; walls for containers such as cargo containers or caskets, etc. The following discussion is therefore quite general insofar as it relates to the cored, molded structural member of this invention, and the method of producing the same. Variations of materials which comprise the various integers, details of construction,etc., are discussed hereafter.

The molded structural member of this invention includes a core which has a plurality of cells formed and defined by a plurality of walls extending between major faces. The core is designated generally at 12 in each of FIGS. 1, 2, 5, 7 and 9, and the cells of the core are generally designated at 14. The specific nature of the core is not considered in detail herein, and it may be a commercially available honeycomb structure which is made of kraft paper. In any event, the core may comprise a plurality of walls 16 defining the cells 14, an upper major face 18 and a lower major face 20. There is a substantially seamless covering over the core, including an upper covering 22 and a lower covering 24, each of which is comprised of a moldable plastic material which expands while it is setting and which, when set, is substantially rigid. The sides of the core, i.e., the outer periphery thereof, may also be covered with the same material so that the overall covering over the core is seamless. The side covering — i.e., the covering over at least a portion of the outer periphery of the core — is indicated generally at 26. The thicknesses of upper and lower coverings 22 and 24, and of the peripheral covering 26, may be equal or they may be varied; and in the case of the peripheral covering 26, the plastic material of the covering will extend into any of the incomplete — i.e., open — cells which are at the face of the outer periphery of the core, such as those designated at 14a in FIG. 1.

Figure 2:
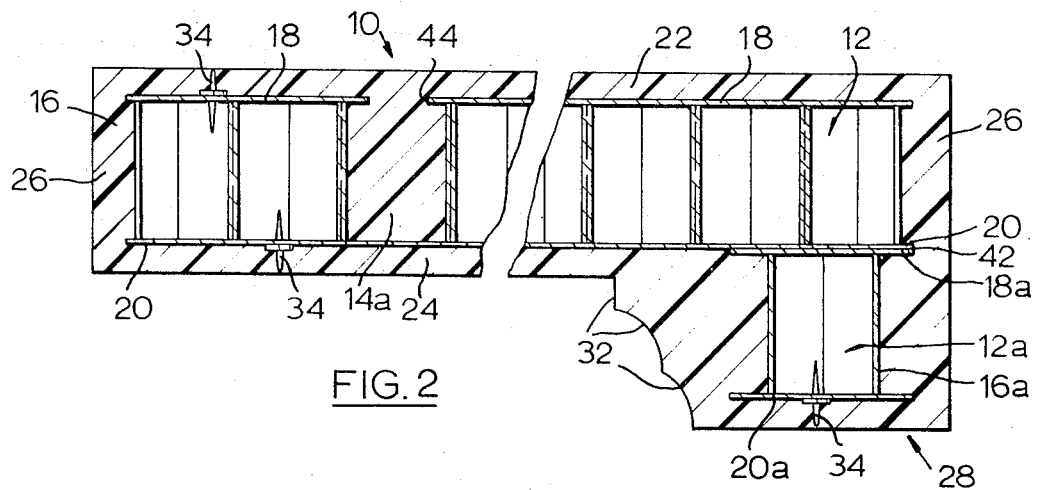

It will be seen that the molded structural member 10 indicated in FIGS. 1 and 2 has an integral, molded trim section 28. As will be discussed hereafter, the trim section 28 is molded together with the remainder of the structural member; and the trim section 28 is indicated, in this instance, as having a forward bevel 30 at the end which can be seen in FIG. 1, and a trim face indicated at 32. Of course, the relative size and cross-section of the trim section 28 is not important; and the trim section is shown for purposes of this discussion, and only as an example.

Figure 4:
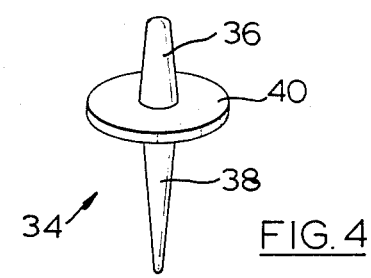
FIG. 4 is a perspective view of a spacer used in this invention.

Referring to FIG. 2, a molded structural member is shown in cross-section, and comprises cores 12 and 12a (core 12a being the core of trim section 28 as discussed hereafter), together with upper and lower covering 22 and 24 and peripheral coverings 26. A plurality of spacers 34 is also indicated in FIG. 2, which spacers 34 may take the form of the spacer illustrated in FIG. 4. Spacer 34 has a first, upper leg 36 and a second, lower leg 38, and the legs are substantially coaxial with one another — i.e., each of legs 36 and 38 is essentially an extension of the other. A substantially flat, planar land 40 projects radially outwardly from the first and second legs 36 and 38. In the usual circumstance, the length of each of the legs 36 and 38 is greater than the thickness of the land 40. Also, the spacer 34 — which may be conveniently produced by injection molding polyethylene in a suitable mold cavity — is such that the leg 36 is somewhat rounded and smooth at its upper end, while the leg 38 is somewhat more pointed. Indeed, the leg 38 may have cruciform cross-section, or otherwise, as desired. In any event, at least the leg 38 of spacer 34 is adapted to pierce the material which comprises the upper or lower face of the core, e.g., the upper and lower faces 18 and 20 respectively of core 12 as well as the lower face 20 of core 12a in FIG. 2. The underside of the land 40 — i.e., the side of land 40 which faces leg 38 — is brought into engagement with the outer side of the face of the core in which the spacer is fitted. If the spacers 34 are generally of a configuration such as that indicated in FIG. 4, they will be reasonably secured in the faces of the core so that the core may be handled without fear or danger of the spacer falling out. As will be noted hereafter, the length of leg 36 of any spacer is determined to be substantially equal to the thickness of the covering over the face in which that spacer is placed.

Referring once again to FIG. 2, it may be noted that the core 12a can be secured to the underside of core 12 — in this instance, by a suitable interface between lower face 20 of core 12 and upper face 18a of core 12a of glue or cement indicated at 42. Also, it may be noted that a discontinuity exists in the upper face 18 of the core 12 at 44, and consequently the plastic material of the covering extends beyond the upper covering 22 and into the cell which is indicated, in this case, at 14a. Also, it will be noted that the thickness of the moldable plastic material at the peripheral coverings 26 is varied, because the moldable plastic material also extends into the partial cells 14a which are at the face of the periphery of the core. It will also be noted that the moldable plastic material varies in thickness at the faces 32 of the trim portion 28.

It has been noted that the moldable plastic material is one which expands while setting and which, when set, is substantially rigid. Thus, a moldable plastic material such as expandable polystyrene beads is useful; and the molded structural member of this invention and the process of making the same have particularly high quality, faithfullness of the surface as discussed hereafter, and low reject rates when the moldable plastic material is foamable polyurethane. The moldable plastic material may be of the self-skinning variety, and in any event, it is such that a rigid skin is formed at the outer surface. To this end, the molds which are used to produce a molded structural member according to this invention are normally designed to promote heat conductivity away from the surface of the molded member when the material being used is polyurethane, or towards the surface when the material being used is polystyrene.

The core of the molded structural member may vary considerably, depending on the purpose to which the molded structural member is to be put, and its cross-section, etc., For example, the molded structural member may be essentially a panel, having a single core such as that illustrated at the left-hand side of FIG. 2; or the molded sturctural member may be such as to have several thicknesses of core in at least a portion thereof, as illustrated at the right-hand side of FIG. 2 where a plurality of major faces of the core are shown at 18, 20, 18a and 20a, with a plurality of walls 16 or 16a within core 12 or 12a to define a plurality of cells such as between pairs of major faces 18 and 20 in core 12 and 18a and 20a in core 12a. Further, the core may be such as core 12b in FIG. 5, having upper and lower faces 18b and 20b respectively, and a heat reflective coating on at least one side of one of the faces such as foil coating 46 on the inside of upper face 18b. An opening or discontinuity 48 is made in foil 46, as discussed hereafter. Still further, the core may have a configuration such as that shown in FIG. 9 by core 12c. In this case, the molded structural member has a curved cross-section — at least in the part shown in FIG. 9 — and the upper face 18c is cut in places such as indicated at 50 so as to accommodate to the curvature of the cross-section of the molded structural member. Thus, certain cells of the core 12c such as cells 14c may be flooded by the moldable plastic material extending thereinto, while other cells such as 14c' will remain intact, and may pressurize as discussed hereafter.

Figure 3:
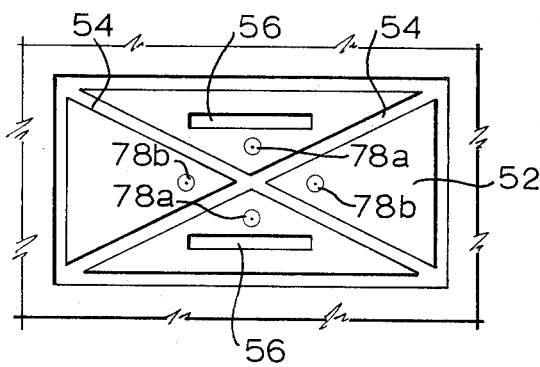
FIG. 3 is a cross-section in plan of a molded structural member according to this invention having integral reinforcing.
Figure 9:
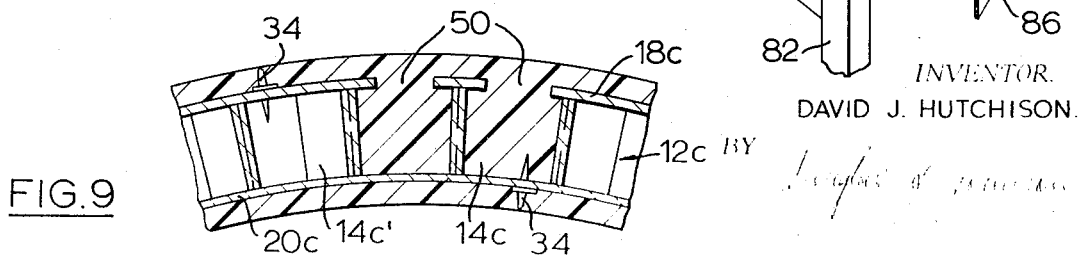
FIG. 9 is a partial cross-sectional view of a further embodiment of the invention where the general configuration of the molded structural member is curved.

In some circumstances, it may be desirable to open some of the cells of the core at at least one end of each through one of the major faces of the core so that the plastic material of the covering can extend into those open cells — in other words, so that there is communication of the plastic material of the covering into the interior of the open cells such as cell 14a of FIG. 2, or cells 14c of FIG. 9. It may happen, for instance, that integral, molded ribbing be provided in a panel such as panel 52 of FIG. 3. In that case, there is shown a pair of diagonal ribs 54 and a pair of short, longitudinally directed ribs 56. All of those ribs — which provide additional structural rigidity to the panel 52 — may be formed by opening some of the cells of the core of panel 52, as discussed above. At least some of the open cells are adjacent to others of the open cells, in each of the ribs as indicated; whereas some others of the open cells are remote from still others of the open cells, for example those cells which are open to provide for rib 56 are remote from those cells which are open to provide for ribs 54. Especially when the plastic covering material is foamable polyurethane, which can be readily machined and into which screws, etc., can be driven, the ribs 54 or 56 — or other areas where the cells of the core are flooded by the polyurethane — may be used for attaching hardware, etc., to the molded structural element.

Figure 5:
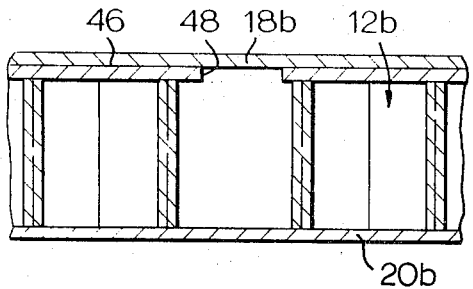
FIG. 5 is a partial cross-section of a different embodiment of a core.
Figure 6:
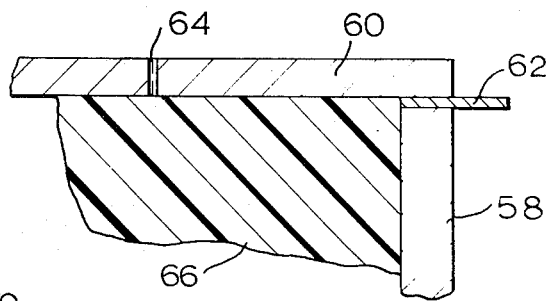
FIG. 6 is a partial cross-section of the corner of a mold, as known in the prior art.

It has been mentioned above that the core structure of the core is such that at least some of the cells thereof are adapted to have gas communications with other, adjacent cells, at least when the gas pressure of any gas which is within those cells is a finite amount above ambient pressure. When the core structure is a paper honeycomb structure, the paper which comprises the walls 16 is such that gas can flow through the paper when the gas is under pressure. In other words, the core of the molded structural member can be pressurized; and it has been mentioned that the gas which flows into and pressurizes the core may be gas which is outgassed from the moldable plastic material as it expands and sets, as well as air which is displaced from thoseportions of the mold into which the expanding plastic material extends. In prior molded products which have in the past been formed without a core which is adapted to be pressurized as discussed above, it has been necessary to provide vents and gassing paper in the mold so as to permit excape of the gas from the mold cavity. FIG. 5 shows a typical prior art mold having a mold side 58 and a mold top 60, with gassing paper 62 between them and a gas vent 64 through the mold top 60. The molded product being formed within the mold is shown generally at 66.

Figure 7:
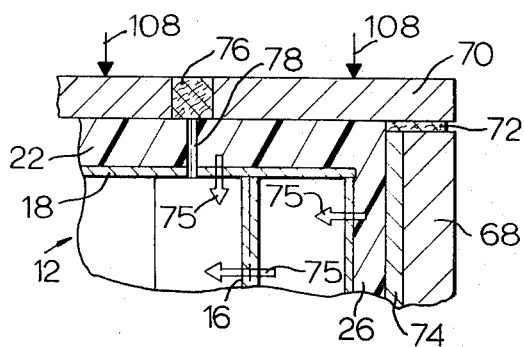
FIG. 7 is a similar cross-section to FIG. 6 showing a molded structural member according to this invention within a mold which is adapted for the process of making the molded structural panel, also as taught by this invention.

Referring now to the method by which a molded structural member according to this invention may be produced, a typical mold for that purpose is shown in FIG. 7. That mold comprises a mold side 68 and a mold top 70; and between the two a gasket 72 is provided, as discussed hereafter. Typically, especially where the molded structural member being formed within the mold of FIG. 7 is such that a particular surface configuration is required — for example, a woodgrain — a mold insert 74 may be provided within the mold, having the relief image of the desired surface configuration formed therein. The mold insert is made by known techniques, and may be produced from butyl rubber, silicon rubber, electroformed metal, etc. A typical core 12 is shown in FIG. 7 having an upper face 18 and walls 16; and upper covering 22 and side covering 26 of moldable plastic material which will comprise the substantially seamless covering over the core 12 are also shown.

Briefly speaking, the method of producing the molded structural member comprises the following steps:

a. placing the core 12 (or 12a, etc., as required) in the cavity of a mold so that the core is supported away from the faces of the mold cavity;

b placing the moldable plastic material which will form the substantially seamless covering over the core into the mold cavity so as to cover the core, as discussed hereafter;

c closing the mold so as to be substantially gas tight insofar that gas flow from within the mold cavity to the exterior thereof is substantially precluded;

d allowing sufficient time to pass for the plastic material to expand and set at least to an extent that the molded structural member can be unmolded from the mold cavity; and e opening the mold and unmolding the molded structural member.

Step c may be carried out between steps a and b, so that the mold may be closed before the plastic material is placed in the mold. In such circumstances, the plastic material is injected or blown into the mold, and the injection or blowing channels are then sealed to provide the gas tight cavity. Also, the gas tight mold cavity may be provided — as indicated above — by the presence of a gasket material in the appropriate parts of the mold which close around the mold cavity. Of course, the gasket material must be placed so that the core can be put into the mold cavity when the mold is open, and the molded structural member unmolded from the mold cavity after the plastic material of the covering thereof has set sufficiently for the unmolding operation.

The simplest way of placing the core in the mold cavity so that it is supported away from the faces of the mold cavity is to use spacers which may be placed in various positions in the faces of the core, such as spacers 34. Assuming, for the moment, that the molded structural member which is being formed is a panel having a molded trim portion, such as illustrated in FIGS. 1 and 2, the spacers 34 are pierced through faces 18, 20 or 18a of cores 12 or 12a respectively in appropriate places, so that, when the core is placed into the mold cavity, it is supported away from the faces of the mold cavity by the spacers. When the plastic material of the covering is such as moldable polyurethane foam, a portion of that material may be precharged into the mold before the core is placed; in other words, part of step (b) — at least so far as the lower portions of the mold cavity may be concerned — may be carried out before step (a). The core may then be placed in the cavity, and the remaining moldable polyurethane may then be charged into the mold. (As mentioned above, the mold might first be closed, and then charged with the plastic material.) It should also be mentioned that materials such as foamable polyurethane may be easily handled because the foaming action does not occur immediately after the prepolymer constituents are mixed together, but rather after a passage of time ranging from several seconds to several minutes, depending on the precise constituents of the plastic being used. Thus, steps (a) and (b) may be manually carried out, as well as automatically carried out with appropriate equipment. Suitable release agents are, of course, used in the mold when required; and the mold faces may be preheated to promote initial foaming of the plastic material of the covering for the core.

As the molding operation continues, particularly as the foaming or expansion of the plastic material of the covering takes place and the plastic material cures or sets, the core may tend to float up, and it is held in place by the spacers in the upper faces thereof. Thus, the land 40 of the spacers acts to distribute any forces which may be transmitted by the spacer from its outer end pushing against a mold cavity face to the face of the core in which the spacer is placed. Also, as noted, the thickness of the covering over the core — such as upper and lower coverings 22 and 24 respectively as shown in FIG. 1 — may be well controlled by the use of spacers 34, because the core cannot approach closer to a mold face than is permitted by the length of leg 36 and the thickness of land 40. The core is therefore substantially precluded from shifting in the mold cavity; even when acted upon by unequal pressure of the expanding plastic material acting against the major faces of the core, as such pressures may develop. The outer tip of the outer leg of a spacer may therefore be somewhat visible at the finished surface of the molded structural element; but especially when the covering of the molded structural element is polyurethane having a highdensity skin, it may be finished by sanding, polishing, staining, etc., if required, to make the outer tip of the spacer completely unobtrusive at the skin of the molded element. Also, the spacers can very often be placed in the core in positions which will be covered by hardware, or otherwise unseen, when the molded structural element is finished and assembled or put to its intended use.

The importance of step (c) of the method of producing the molded structural element as noted above, now becomes evident. Because of the substantial reduction in the amount of moldable plastic material used in the production of any cored, molded structural member, and the concomitant cost and weight reduction because the cost and weight per unit volume of honeycomb core material is less than the cost and weight per unit volume of the plastic material, substantial economies in the production of molded structural members using foamable plastic materials can be realized. Also, when plastic material such as foamable polyurethane is used where the setting action of the material is exothermic, better control over the quality of the product can be achieved by having thinner sections of the material and better heat conductivity away therefrom. Thus, the quality of the surface of the cored, molded structural member made according to this invention can be more easily controlled and more readily predicted, with lower reject rates and better economy. It is, however, very often desirable that the molded structural member be substantially monolithic with a substantially seamless covering. Thus, in order to realize the economies noted above, as well as to achieve faster molding times, and therefore a faster rate of production from any one mold, the presence of the core within the mold cavity when the cored, molded structural product is being produced provides a place for gas to migrate. The core is somewhat pressurized as gas enters into the cells thereof or attempts to expand because of the heat produced during exothermic setting of some plastic materials or the heat conducted to the mold to promote skinning of other plastic materials. Generally, as the plastic material expands to have a multicellular structure - with higher density of the material, i.e., fewer and smaller cells at the outer face — the gas and air which are entrapped within the cells of the core tend to be further pressurized because they cannot escape outwardly from the core into the plastic material. However, as noted, the core material is such that at least some of the cells are adapted to have gas communication with other, adjacent cells at least when the gas and air within them is pressurized. Gas and air flow into the core, and between cells, is indicated generally by arrows 75 in FIG. 7.

When sufficient time has passed that the plastic material of the covering of the molded structural member within the mold cavity has set sufficiently so as to permit unmolding of the product from the mold, the mold may then be opened and the unmolding step effected. However, depending on factors such as the size of the molded product, and particularly the displaced volume of the core within the product, as well as the purposes to which the product may be put, it may very often be necessary to relieve the pressure within the core before the mold is opened and the product unmolded. Thus, a plug 76 may be provided in the mold top 70 so that a passage indicated at 78 through the covering 22 can be made so as to provide gas communication from the cell into which passage 78 extends to the ambient. Of course, suitable care is taken so that the passages 78 are placed so as to avoid communication with a cell which has been flooded by the plastic material of the covering. Thus, passages may be provided in the panel 52 of FIG. 3 in places chosen so as to avoid the ribs 54 or 56, such as those indicated at 78a and 78b. Also, it should be noted that the passages 78 (or 78a, etc.) are normally placed through the plastic material of the seamless covering over the core in a position that is normally out of sight or which can be easily repaired. For example, a cored, molded structural member such as that illustrated in FIGS. 1 and 2 would normally be put to a use so that the upper covering 22 is the back side of the member. Pressure relief of the pressurized core can therefore be easily achieved.

When a gas passage such as passage 78 is opened through the plastic material of the covering and into a cell of the core, that particular cell will first depressurize, and a differential pressure will then develop between it and adjacent cells surrounding it. While the differential pressure remains, gas may be driven from other, pressurized, cells within the core to the cell which is open to the ambient, at least until the differential pressure between cells is not sufficient to drive the gas through the walls separating and defining the cells. As noted, some molded structural members having a pressurized core may be unmolded from the mold cavity without first pressure relieving the core; and of those products, some may be put to their intended use, still without pressure relief of the core, because the pressure developed within the core and the quantity of gas and air entrapped — as well as the strength of the covering, including its thickness and its span, etc. — may be such that pressure relief of the core is unnecessary.

Figure 8:
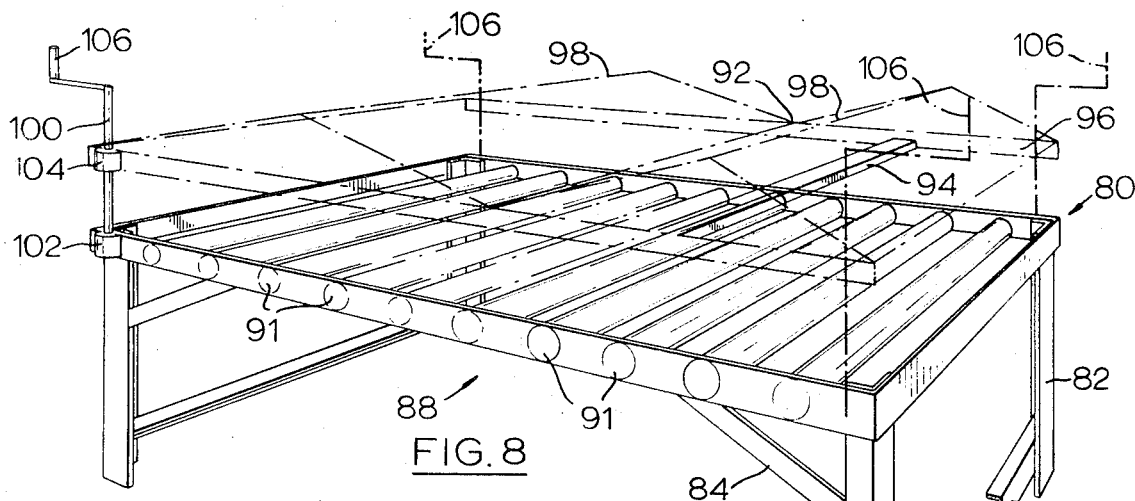
FIG. 8 is a generally schematic, perspective view of a press table used during the production of molded structural members according to this invention.

On the other hand, it very often happens that the molded structural member being produced according to this invention may take the form of a large panel; so that pressurization of the core may be such as to cause bowing of the major surfaces of the panel. Pressure relief in these circumstances is indicated. However, it has been noted that it is not desirable to provide pressure relief of the core at least until the plastic material of the covering has substantially set. Further, as noted above, the step of making the pressure relief of the core should occur before the molded structural element is unmolded from the mold cavity. Again, depending particularly upon the relative dimensions of the product, the mold may be designed to withstand the pressures which develop within the core during the time that the plastic material expands and sets. Otherwise, it is very often desirable to place compression means over the mold so as to reinforce it against the internal pressures which are developed within it. Thus, a plurality of C-clamps may be placed around the mold; or other means may be provided for reinforcing the mold, including such means as air or hydraulic presses. A more simple, manually operated press table is shown in FIG. 8.

The press table 80 comprises a plurality of legs 82 which may be braced at 84 and tied together at 86 to support a lower frame 88. The lower frame 88 comprises a pair of side bars 90 having a plurality of rollers 91 extending between them, and journaled so as to be freely rotatable. An upper frame 92 may also include a plurality of rollers, and in any event it includes a plurality of beams 94 which may be rollers or bars and which are substantially rigid in a vertical direction between side bars 96. A superstructure 98 may also be provided so as to distribute forces within the upper frame 92. Upper frame 92 may be supported on threaded columns 100 which are secured at their lower ends 102 to the lower frame 88; and the columns 100 may each have a threaded sleeve 104 attached to the upper frame 92, and a crank 106 to provide relative motion of the upper frame 92 with respect to the lower frame 88.

Thus, a mold of some considerable size (and weight) can be reinforced against internal pressures developed within it as the plastic material of the covering expands and sets, such as by pushing the mold across the rollers 91 of press table 80 so that it lies over them and between the upper and lower frames 92 and 88. The cranks 106 can then be operated to bring the upper frame 92 over the mold and to place the upper side of the mold against the rollers or bars 94 so that a reaction force, such as that indicated at 108 in FIG. 7, can develop as the internal pressure within the mold cavity — i.e. within the core of the structural member being molded — builds up while the plastic covering material expands and sets.

When the core of a molded structural member according to this invention is such as core 12b in FIG. 5, having a foil coating 46 on one side of the upper face 18b, openings or discontinuities in the foil covering are provided in various locations such as indicated at 48 in FIG. 5. Migration of air and gas into the core 12b through the discontinuities 48 of the foil coating 46 — and through the material of the upper face 18b of the core 12b — is therefore accommodated, especially when the rate of foaming and expansion of the plastic covering material is not so great as to entrap air or gas between the plastic material and the surface 18 of the core. A panel having a core such as core 12b of FIG. 5, is particularly adapted for use as an outer wall panel in housing or other enclosures where a large temperature differential from within the enclosure to without may be encountered - e.g. Arctic or tropical housing and shelter for personnel and equipment.

The gasket material which may be used for the gasket 72 shown in FIG. 7 is normally one which can withstand compression forces against it, and may be made of butyl rubbers; soft copper sheeting or strips; lead sheeting; impregnated neoprene, etc. Indeed, when the mold insert 74 is butyl rubber, the gasket 72 may be molded integrally with the mold insert. It is also possible, by proper finishing of the material of the mold top 70 and the mold insert 74 or the mold side 68 to effect a substantially gas-tight seal in the gasket area indicated by gasket 72 by a metal-to-metal contact of the underside of the mold top 70 to an opposed metal face.

The core 12, particularly core 12b shown in FIG. 5, may have one or other or both of its upper and lower faces 18 and 20 (or 18b and 20b) replaced by foil, rather than having a foil coating on one side of one of the upper and lower faces. In the event that either or both of the upper and lower faces is replaced by foil, openings or discontinuities, such as that indicated at 48 in FIG. 5 are provided so as to accommodate gas and air flow inwardly towards the interior of the core.

Generally speaking, the thickness of the molded structural element at any point is equivalent to the height of the mold cavity at that point; and is substantially equal to the sum of the thickness of the core and the height of the spacers which are upstanding from the core on its major faces, when the spacers are used. Thus, the thickness of the covering of the plastic material over the core can be controlled. Also, the amount of charge of plastic material which is placed in the mold can be easily calculated from knowledge of the volume of the mold cavity and of the displaced volume of the core, with appropriate allowances made for flooding of whatever cells may be opened for that purpose, and of partial cells at the periphery of the core. Therefore, the weight of the molded structural element can be determined, as well as the density of the expanded plastic covering over the core. Indeed, with some experience and knowledge of the heat flow characteristics away from (or towards) the mold, close control of the density gradient of the plastic covering over the core can be maintained, as well as control over the density of the skin formed at the outer surface of the plastic covering.

It has been indicated above that the outer tip of the outer leg of a spacer may be somewhat visible at the surface of a molded structural element made according to this invention. This may be more noticeable when the mold faces or inserts have a low durometer hardness, e.g., certain of the butyl rubbers. However, with higher durometer hardness mold faces and inserts, e.g., harder rubbers and metals, there is very little likelihood that the outer tip of the outer leg of a spacer will be visible at the surface of the molded structural element.

It should be noted that higher structural and dimensinal stability and greater dimensional accuracy of molded structural elements produced according to this invention can be achieved because of the substantially direct proportionality of the percentage or rate of dimensional distribution of polyurethane to the volume (i.e., amount) of polyurethane used in a given molded structural element, thinner coverings of the core and therefore greater dimensional accuracy may be achieved.

There has been described a molded structural member having a substantially seamless covering over a core, where the covering is of a plastic material which expands while it sets, and which, when set, is substantially rigid; and wherein the core has a plurality of cells defined between at least one pair of major faces with at least some of the cells having gas communication with other, adjacent cells at least when the pressure of gas and/or air within the cells is above the ambient pressure. A method of producing a cored, molded structural member as discussed above, has also been shown. Several variations to the product and the method have been discussed, particularly with respect to the order of several of the steps of the method and the carrying out of several of the finishing steps; and having regard to the nature of the core and of the covering material which may be used in the molded structural member of this invention.

The embodiments of the invention in which an exclusive property or privilege is claimed are defined as follows:

1. A method of producing a molded structural member having a core and a substantially seamless covering over said core; where said core has spaced apart first and second major faces and a plurality of walls extending between them to define a plurality of cells between said major faces, and where said first and second major faces and plurality of walls extending there between have openings which communicate with the interior of the cells, comprising the steps of:

a Placing a core in a cavity in a mold so that the core is supported away from the faces of said mold cavity;

b introducing a foamable thermosetting synthetic plastic material which expands while it is setting into said mold cavity and which, when set, will form a substantially rigid, into encasement of said core;

c closing said mold to be substantially gas-tight so that gas flow from within said mold to the exterior thereof is substantially precluded and so that gas entrained in said mold and formed during the expanding of said formable thermosetting synthetic plastic material, is driven into said core;

d allowing sufficient time to pass for said plastic material to set at least sufficiently so as to permit unmolding of said molded structural member; and e opening said mold and unmolding said molded structural member from said mold cavity.

2. The method of claim 1 where said step (c) is carried out between steps (a) and (b) and said foamable thermosetting synthetic plastic is a foamable polyurethane resin.

3. The method of claim 1 where said mold is made substantially gas-tight by gasket material placed between the parts of said mold which close around said mold cavity; so that, when said mold is open, the steps of placing at least said core into said mold cavity and the unmolding of the molded structural member therefrom can be carried out.

4. The method of claim 1, further comprising the step of:

f after step (d) and before step (e), making at least one passage through a face of said mold and through said plastic material and at least one of said major faces of said core, and extending into at least one of said cells of said core so as to provide gas communication from said at least one cell to the surrounding atmosphere.

5. The method of claim 4, further comprising the step of:

g placing compression means over said mold to reinforce the mold against internal pressures developed within it as said moldable plastic material is setting.

6. The method of claim 4, further comprising the step of:

h at least before step (b), placing a plurality of spacers on at least one of said major faces of said core, each of which has a first and a second leg substantially coaxial with one another on either side of a substantially flat, planar land projecting radially outwardly from said first and second legs; the lengths of said first and second legs, respectively, being each greater than the thickness of the land; so that said second leg of each of said plurality of spacers pierces through the one of said major faces of said core on which it is placed so that the land of each said spacer is on the outer side of the respective one of said major faces.

7. The method of claim 6, further comprising the step of:
i at least before step (b), providing opening to a plurality of cells of said core through one of said major faces, so as to provide communication thereinto of said moldable plastic material, and so that at least some of said open cells are adjacent to others of said open cells.

* * * * *